US 11,452,069 B2

United States Patent
Zhu et al.

(10) Patent No.: US 11,452,069 B2
(45) Date of Patent: Sep. 20, 2022

(54) COMMUNICATION METHOD AND COMMUNICATIONS DEVICE

(71) Applicant: HUAWEI TECHNOLOGIES CO., LTD., Guangdong (CN)

(72) Inventors: Xiaosong Zhu, Beijing (CN); Yiling Wu, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 12 days.

(21) Appl. No.: 16/886,949

(22) Filed: May 29, 2020

(65) Prior Publication Data

US 2020/0296687 A1    Sep. 17, 2020

Related U.S. Application Data

(63) Continuation of application No. PCT/CN2017/114042, filed on Nov. 30, 2017.

(51) Int. Cl.
*H04W 68/02* (2009.01)
*H04W 76/11* (2018.01)
(Continued)

(52) U.S. Cl.
CPC .......... *H04W 68/02* (2013.01); *H04W 4/06* (2013.01); *H04W 68/005* (2013.01); *H04W 76/11* (2018.02)

(58) Field of Classification Search
CPC ....... H04W 68/02; H04W 76/11; H04W 4/06; H04W 68/005
See application file for complete search history.

(56) References Cited

U.S. PATENT DOCUMENTS

| 9,603,097 B2 * | 3/2017 | Bhattacharjee ..... H04W 52/028 |
| 2007/0082683 A1 | 4/2007 | Na et al. |

(Continued)

FOREIGN PATENT DOCUMENTS

| CN | 102448167 A | 5/2012 |
| CN | 102469585 A | 5/2012 |

(Continued)

OTHER PUBLICATIONS

International Search Report dated Aug. 20, 2018, issued in counterpart Application No. PCT/CN2017/114042, with English translation. (13 pages).

(Continued)

*Primary Examiner* — Joshua L Schwartz
(74) *Attorney, Agent, or Firm* — WHDA, LLP

(57) ABSTRACT

This application provides a communication method and a communications device. The method includes: receiving, by an access network device from a core network device, a first group identifier of a first terminal group and an identifier of a terminal included in the first terminal group; and sending, by the access network device, the first group identifier and a second group identifier of the first terminal group to the terminal included in the first terminal group. The first group identifier and the second group identifier are used to indicate a paging occasion for the first terminal group, and a paging message for the first terminal group is transmitted on a first physical channel. The technical solutions in the embodiments of this application can improve system efficiency.

20 Claims, 6 Drawing Sheets

(51) Int. Cl.
*H04W 4/06* (2009.01)
*H04W 68/00* (2009.01)

(56) References Cited

U.S. PATENT DOCUMENTS

| | | | | |
|---|---|---|---|---|
| 2008/0032713 | A1* | 2/2008 | Yang | H04W 68/04 |
| | | | | 455/458 |
| 2010/0081454 | A1* | 4/2010 | Wang | H04W 68/02 |
| | | | | 455/456.1 |
| 2011/0223942 | A1* | 9/2011 | Xu | H04W 68/00 |
| | | | | 455/458 |
| 2012/0282925 | A1* | 11/2012 | Wehmeier | H04W 36/0085 |
| | | | | 455/434 |
| 2014/0038647 | A1 | 2/2014 | Zhang et al. | |
| 2016/0007170 | A1 | 1/2016 | Vaidya et al. | |
| 2016/0316451 | A1 | 10/2016 | Hsu et al. | |
| 2018/0007733 | A1* | 1/2018 | Mochizuki | H04W 48/20 |
| 2018/0042054 | A1* | 2/2018 | Han | H04W 72/0446 |
| 2018/0199310 | A1* | 7/2018 | Islam | H04W 68/02 |
| 2018/0270790 | A1 | 9/2018 | Shi et al. | |

FOREIGN PATENT DOCUMENTS

| | | |
|---|---|---|
| CN | 102857869 A | 1/2013 |
| CN | 102857969 A | 1/2013 |
| CN | 102958003 A | 3/2013 |
| CN | 103686614 A | 3/2014 |
| CN | 106961727 A | 7/2017 |
| CN | 107079250 A | 8/2017 |
| EP | 2658330 A1 | 10/2013 |
| EP | 2658338 A1 | 10/2013 |
| WO | 0137453 A1 | 5/2001 |
| WO | 2017101102 A1 | 6/2017 |

OTHER PUBLICATIONS

Extended (Supplementary) European Search Report dated Sep. 25, 2020 issued in counterpart EP application No. 17933225.9. (13 pages).

Huawei et al, "Collision handling for multicast in NB-IoT", 3GPP TSG RAN WG1 Meeting #87, R1-1611153, Reno, USA, Nov. 14-18, 2016. (4 pages).

Office Action dated Nov. 27, 2020, issued in counterpart CN Application No. 201780096764.7, with English Translation. (38 pages).

He Erchao et al., "Analysis on the Paging Mechanism and Paging Capacity of the LTE Network". Data Communication, Editorial Department Mailbox, Issue 01, 2014. (5 pages).

Hamidreza Ghafghazi et al., "11—Security and Privacy in LTE-based Public Safety Network". Wireless Public Safety Networks 2, 2016, pp. 317-364.

Notice of Allowance dated Aug. 31, 2021, issued in counterpart CN Application No. 201780096764.7, with English translation. (7 pages).

* cited by examiner

COMMUNICATION METHOD AND COMMUNICATIONS DEVICE

CROSS-REFERENCE TO RELATED APPLICATIONS

This application is a continuation of International Application No. PCT/CN2017/114042, filed on Nov. 30, 2017, the disclosure of which is hereby incorporated by reference in its entirety.

TECHNICAL FIELD

This application relates to the communications field, and in particular, to a communication method and a communications device.

BACKGROUND

Internet of things (Internet of Things, IoT) will become an important application in the future communications field. Future IoT communication may mainly cover smart metering, medical examination and monitoring, logistics inspection, industrial inspection and monitoring, internet of vehicles, smart communities, communication of wearable devices, and the like. As the mobile internet and the IoT industry develop, more mobile terminals are connected to each other and share more abundant data. An enterprise internet of things (Enterprise internet of thing, eIoT) market imposes requirements of low costs, low power consumption, easy deployment, and maintenance-free on an internet of things system device. Therefore, a narrowband communications system on an unlicensed spectrum can satisfy the foregoing requirements.

There is no multicast mechanism in an eIoT system, and the eIoT system does not support a physical downlink control channel (Physical Downlink Control Channel, PDCCH). To be specific, there is no scheduling indication information. Currently, when a control command is sent to a group of users, for example, street lamps corresponding to a group of users are turned on in a lamp control scenario, a latency needs to be as short as possible on the premise that reliability is ensured. Currently, the system can deliver commands one by one only in unicast mode. Consequently, when there are a large quantity of users, a command delivery latency is comparatively long, and system efficiency is affected.

Therefore, how to implement multicast in an interne of things system and improve system efficiency becomes an urgent technical problem to be resolved.

SUMMARY

This application provides a communication method and a communications device, to improve system efficiency.

According to a first aspect, a communication method is provided. The method includes: receiving, by an access network device from a core network device, a first group identifier of a first terminal group and an identifier of a terminal included in the first terminal group; and sending, by the access network device, the first group identifier and a second group identifier of the first terminal group to the terminal included in the first terminal group. The first group identifier and the second group identifier are used to indicate a paging occasion for the first terminal group, and a paging message for the first terminal group is transmitted on a first physical channel.

In the technical solution in this embodiment of this application, group configuration is performed on a plurality of terminals, so that the paging message for the terminal group can be sent in multicast mode, and system efficiency can be improved.

With reference to the first aspect, in some implementations of the first aspect, the method further includes: receiving, by the access network device, the second group identifier from the core network device.

With reference to the first aspect, in some implementations of the first aspect, the method further includes: allocating, by the access network device, the second group identifier to the first terminal group.

With reference to the first aspect, in some implementations of the first aspect, the method further includes: sending, by the access network device, an identifier of the first physical channel to the terminal included in the first terminal group.

With reference to the first aspect, in some implementations of the first aspect, the method further includes: broadcasting, by the access network device, an association relationship between the first terminal group and the first physical channel.

With reference to the first aspect, in some implementations of the first aspect, the first physical channel is agreed on in advance.

With reference to the first aspect, in some implementations of the first aspect, the method further includes: sending, by the access network device, a priority of the first terminal group or a modulation and coding scheme used for the paging message for the first terminal group to the terminal included in the first terminal group. The priority is received from the core network device, and the priority is used to determine whether the paging message for the first terminal group is preferentially transmitted on the paging occasion.

With reference to the first aspect, in some implementations of the first aspect, the method further includes: broadcasting, by the access network device, a priority of the first terminal group or a modulation and coding scheme used for the paging message for the first terminal group. The priority is received from the core network device, and the priority is used to determine whether the paging message for the first terminal group is preferentially transmitted on the paging occasion.

According to a second aspect, a communication method is provided. The method includes: sending, by a core network device, a first group identifier of a first terminal group and a second group identifier of the first terminal group to an access network device; and sending, by the core network device, the first group identifier and the second group identifier to a terminal included in the first terminal group. The first group identifier and the second group identifier are used to indicate a paging occasion for the first terminal group, and a paging message for the first terminal group is transmitted on a first physical channel. In the technical solution in this embodiment of this application, group configuration is performed on a plurality of terminals, so that the paging message for the terminal group can be sent in multicast mode, and system efficiency can be improved.

According to a third aspect, a communication method is provided. The method includes: receiving, by an access network device, a first group identifier of a first terminal group and a second group identifier of the first terminal group that are sent by a core network device. The first group identifier and the second group identifier are used to indicate a paging occasion for the first terminal group, and a paging message for the first terminal group is transmitted on a first physical channel.

According to a fourth aspect, a communication method is provided. The method includes: sending, by a core network device, a first group identifier of a first terminal group to an access network device; receiving, by the core network device, a second group identifier of the first terminal group from the access network device; and sending, by the core network device, the first group identifier and the second group identifier to a terminal included in the first terminal group. The first group identifier and the second group identifier are used to indicate a paging occasion for the first terminal group, and a paging message for the first terminal group is transmitted on a first physical channel. In the technical solution in this embodiment of this application, group configuration is performed on a plurality of terminals, so that the paging message for the terminal group can be sent in multicast mode, and system efficiency can be improved.

According to a fifth aspect, a communication method is provided. The method includes: receiving, by an access network device, a first group identifier that is of a first terminal group and that is sent by a core network device; and sending, by the access network device, a second group identifier of the first terminal group from the core network device. The first group identifier and the second group identifier are used to indicate a paging occasion for the first terminal group, and a paging message for the first terminal group is transmitted on a first physical channel.

With reference to any one of the second aspect to the fifth aspect, in some implementations of the any one of the second aspect to the fifth aspect, the method further includes: receiving, by the core network device, an identifier of the first physical channel from the access network device; and sending, by the core network device, the identifier of the first physical channel to the terminal included in the first terminal group.

With reference to any one of the second aspect to the fifth aspect, in some implementations of the any one of the second aspect to the fifth aspect, the first terminal group and the first physical channel are agreed on in advance.

With reference to any one of the second aspect to the fifth aspect, in some implementations of the any one of the second aspect to the fifth aspect, an association relationship between the first terminal group and the first physical channel is broadcast in an area served by the access network device.

With reference to any one of the second aspect to the fifth aspect, in some implementations of the any one of the second aspect to the fifth aspect, the method further includes: sending, by the core network device, a priority of the first terminal group to the access network device; and sending, by the core network device, the priority to the terminal included in the first terminal group, or broadcasting the priority in the area served by the access network device.

The priority is used to determine whether the paging message for the first terminal group is preferentially transmitted on the paging occasion.

With reference to any one of the second aspect to the fifth aspect, in some implementations of the any one of the second aspect to the fifth aspect, the method further includes: receiving, by the core network device from the access network device, a modulation and coding scheme used for the paging message for the first terminal group, and sending, by the core network device, the modulation and coding scheme to the terminal included in the first terminal group; or broadcasting a modulation and coding scheme used for the paging message for the first terminal group in the area served by the access network device.

According to a sixth aspect, a communication method is provided. The method includes: receiving, by a terminal, a first group identifier and a second group identifier of a first terminal group that are sent by an access network device or a core network device, where the terminal is a terminal included in the first terminal group. The first group identifier and the second group identifier are used to indicate a paging occasion for the first terminal group, and a paging message for the first terminal group is transmitted on a first physical channel.

In the technical solution in this embodiment of this application, group configuration is performed on a plurality of terminals, so that the paging message for the terminal group can be sent in multicast mode, and system efficiency can be improved.

With reference to the sixth aspect, in some implementations of the sixth aspect, the first group identifier is allocated by the core network device; and the second group identifier is allocated by the core network device or the access network device.

With reference to the sixth aspect, in some implementations of the sixth aspect, the terminal receives an identifier that is of the first physical channel and that is sent by the core network device or the access network device; or the first physical channel is agreed on in advance; or an association relationship between the first terminal group and the first physical channel is broadcast in an area served by the access network device.

With reference to the sixth aspect, in some implementations of the sixth aspect, the method further includes: receiving, by the terminal, a priority that is of the first terminal group and that is sent by the core network device; and receiving, by the terminal, the priority sent by the access network device or the priority broadcast in the area served by the access network device. The priority is used to determine whether the paging message for the first terminal group is preferentially transmitted on the paging occasion.

With reference to the sixth aspect, in some implementations of the sixth aspect, the method further includes: receiving, by the terminal, a modulation and coding scheme that is used for the paging message for the first terminal group and that is sent by the core network device or the access network device, or receiving, by the terminal, a modulation and coding scheme that is used for the paging message for the first terminal group and that is broadcast in the area served by the access network device.

With reference to any one of the foregoing aspects, in some implementations, the paging message includes control information for the first terminal group.

According to a seventh aspect, a communication method is provided. The method includes: receiving, by an access network device, control information for a first terminal group from a core network device; and sending, by the access network device, a paging message for the first terminal group on a paging occasion for the first terminal group over a first physical channel associated with the first terminal group, where the paging message includes the control information. The paging occasion is determined by a first group identifier and a second group identifier of the first terminal group, and the paging message carries the second group identifier.

In the technical solution in this embodiment of this application, the control information is sent in multicast mode by using the paging message for the terminal group, so that a sending latency can be reduced, and system efficiency can be improved.

In some implementations, the sending, by the access network device, a paging message for the first terminal group on a paging occasion for the first terminal group over a first physical channel associated with the first terminal group includes: sending, by the access network device, the paging message on the paging occasion over the first physical channel based on a priority of the first terminal group.

According to an eighth aspect, a communication method is provided. The method includes: receiving, by a terminal, a paging message, sent by an access network device, for a first terminal group on a paging occasion for the first terminal group over a first physical channel associated with the first terminal group, where the terminal is a terminal included in the first terminal group, and the paging message includes control information for the first terminal group. The paging occasion is determined by a first group identifier and a second group identifier of the first terminal group, and the paging message carries the second group identifier.

In the technical solution in this embodiment of this application, the control information is sent in multicast mode by using the paging message for the terminal group, so that a sending latency can be reduced, and system efficiency can be improved.

With reference to the eighth aspect, in some implementations of the eighth aspect, the receiving, by a terminal included in a first terminal group, a paging message, sent by an access network device, for the first terminal group on a paging occasion for the first terminal group over a first physical channel associated with the first terminal group includes: receiving, by the terminal, the paging message on the paging occasion over the first physical channel based on a priority of the first terminal group.

In some implementations, the paging message is scrambled by using the second group identifier; or a MAC header of the paging message includes the second group identifier.

In some implementations, the paging message is scrambled by using the second group identifier; or a MAC header of the paging message includes the second group identifier.

In some implementations, the first group identifier is allocated by the core network device; and the second group identifier is allocated by the core network device or the access network device.

In some implementations, the first group identifier is allocated by the core network device; and the second group identifier is allocated by the core network device or the access network device.

In some implementations, an identifier of the first physical channel is sent by the access network device or the core network device to the terminal included in the first terminal group; or an association relationship between the first terminal group and the first physical channel is broadcast in an area served by the access network device; or the first physical channel is agreed on in advance.

In some implementations, an identifier of the first physical channel is sent by the access network device or the core network device to the terminal included in the first terminal group; or an association relationship between the first terminal group and the first physical channel is broadcast in an area served by the access network device; or the first physical channel is agreed on in advance.

In some implementations, the priority of the first terminal group is determined by the core network device, and is sent by the core network device or the access network device to the terminal included in the first terminal group or is broadcast by the access network device.

In some implementations, the priority of the first terminal group is determined by the core network device, and is sent by the core network device or the access network device to the terminal included in the first terminal group or is broadcast by the access network device.

In some implementations, a modulation and coding scheme used for the paging message for the first terminal group is determined by the access network device, and is sent by the access network device or the core network device to the terminal included in the first terminal group or is broadcast by the access network device.

In some implementations, a modulation and coding scheme used for the paging message for the first terminal group is determined by the access network device, and is sent by the access network device or the core network device to the terminal included in the first terminal group or is broadcast by the access network device.

In some implementations, the method further includes: receiving, by the access network device, a group modification request sent by the core network device; and modifying, by the access network device, the first terminal group based on the group modification request.

In some implementations, the method further includes: receiving, by the access network device, a group modification request sent by the core network device; and modifying, by the access network device, the first terminal group based on the group modification request.

In some implementations, the method further includes: sending, by the core network device, a group exit request to the terminal included in the first terminal group; receiving, by the core network device, a group exit response sent by the terminal; and sending, by the core network device, a group modification request to the access network device, where the group modification request is used by the access network device to modify the first terminal group.

In some implementations, the method further includes: sending, by the core network device, a group exit request to the terminal included in the first terminal group; receiving, by the core network device, a group exit response sent by the terminal; and sending, by the core network device, a group modification request to the access network device, where the group modification request is used by the access network device to modify the first terminal group.

In some implementations, the method further includes: receiving, by the terminal, a group exit request sent by the core network device; and determining, by the terminal based on the group exit request, to exit the first terminal group.

In some implementations, the method further includes: receiving, by the terminal, a group exit request sent by the core network device; and determining, by the terminal based on the group exit request, to exit the first terminal group.

With reference to any one of the foregoing aspects, in some implementations, the first group identifier is a group international mobile subscriber identity (G-IMSI).

With reference to any one of the foregoing aspects, in some implementations, the second group identifier is a group radio network temporary identifier (G-RNTI).

With reference to any one of the foregoing aspects, in some implementations, the first physical channel is a virtual physical downlink shared channel (vPDSCH).

According to a ninth aspect, a communications device is provided. The communications device is configured to perform the method according to any one of the first aspect to the eighth aspect or any possible implementation of the first aspect to the eighth aspect.

According to a tenth aspect, a communications device is provided. The device includes: a memory, configured to store a computer program; and a processor, configured to execute the computer program stored in the memory, so that the device performs the method according to any one of the first aspect to the eighth aspect or any possible implementation of the first aspect to the eighth aspect.

With reference to any one of the foregoing aspects, in some implementations, the communications device may be a chip.

According to an eleventh aspect, a readable storage medium is provided. The readable storage medium includes a program or an instruction. When the program or the instruction is run on a computer, the method according to any one of the first aspect to the eighth aspect or any possible implementation of the first aspect to the eighth aspect is performed.

According to a twelfth aspect, a computer program product including an instruction is provided. When the computer program product runs on a computer, the computer is enabled to perform the method according to any one of the first aspect to the eighth aspect or any possible implementation of the first aspect to the eighth aspect.

DESCRIPTION OF EMBODIMENTS

The following describes the technical solutions in the embodiments of this application with reference to the accompanying drawings in the embodiments of this application.

The embodiments of this application may be applied to various communications systems, such as: a global system for mobile communications (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS), a worldwide interoperability for microwave access (Worldwide Interoperability for Microwave Access, WiMAX) communications system, and a 5G system.

Figure 1:
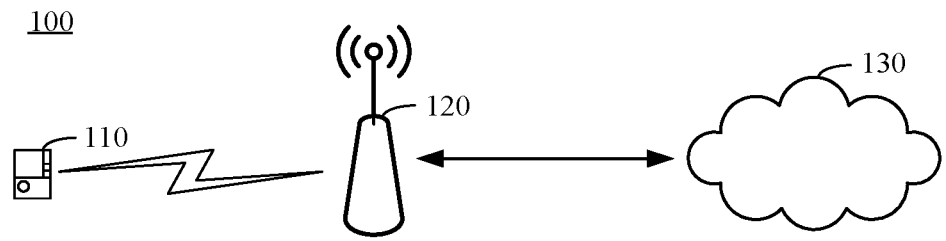
FIG. 1 is a schematic diagram of a communications system to which an embodiment of this application is applicable.

FIG. 1 shows a communications system 100 to which an embodiment of this application is applied. The communications system 100 may include at least one terminal 110, an access network device 120, and a core network device 130. In some possible designs, a plurality of terminals 110 may be grouped based on a service feature. The access network device 120 may be a device that communicates with the terminal 110, such as a base station or a base station controller. The core network device 130 has functions of providing a connection for a terminal, managing a terminal, and completing service carrying, and functions as an interface provided by a bearer network for an external network. In the embodiments of this application, the core network device 130 is connected to the access network device 120 by using a u-S1AP message in a u-S1 interface, and the access network device 120 is connected to the terminal 110 over an air interface Uu. Each access network device 120 may provide communication coverage for a particular geographical area, and may communicate with a terminal located in the coverage area (cell).

This specification describes the embodiments with reference to a terminal. The terminal may alternatively be a terminal device, user equipment (User Equipment, UE), an access terminal, a subscriber unit, a subscriber station, a mobile station, a mobile station, a remote station, a remote terminal, a mobile device, a user terminal, a wireless communications device, a user agent, or a user apparatus. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal in a future 5G network, a terminal in a future evolved public land mobile network (Public Land Mobile Network, PLMN), or the like.

This specification describes the embodiments with reference to an access network device. The access network device may alternatively be a network device. The network device may be a device configured to communicate with a terminal. The network device may be a base transceiver station (Base Transceiver Station, BTS) in a global system for mobile communications (Global System of Mobile communication, GSM) or code division multiple access (Code Division Multiple Access, CDMA) system, a NodeB (NodeB, NB) in a wideband code division multiple access (Wideband Code Division Multiple Access, WCDMA) system, an evolved NodeB (Evolutional Node B, eNB or eNodeB) in a long term evolution (Long Term Evolution, LTE) system, or a radio controller in a cloud radio access network (Cloud Radio Access Network, CRAN) scenario. Alternatively, the network device may be a relay station, an access point, a vehicle-mounted device, a wearable device, a network device in a future 5G network, a network device in a future evolved PLMN network, or the like.

In the embodiments of this application, the communications system 100 may be an unlicensed spectrum system, for example, internet of things (Internet of Things, IoT). However, this is not limited in the embodiments of this application. A main service scope of future internet of things communication may cover smart metering, medical examination and monitoring, logistics inspection, industrial inspection and monitoring, internet of vehicles, smart communities, communication of wearable devices, and the like. The internet of things industry developed based on machine type communication (Machine Type Communication, MTC) is considered as the fourth wave of the information industry following the computer, the internet, and the mobile communications network, and is a development direction of a future network. In addition, an enterprise internet of things market imposes requirements of low costs, low power consumption, easy deployment, and maintenance-free on an internet of things system device. Therefore, a narrowband communications system on an unlicensed spectrum can satisfy the foregoing requirements.

Figure 2:
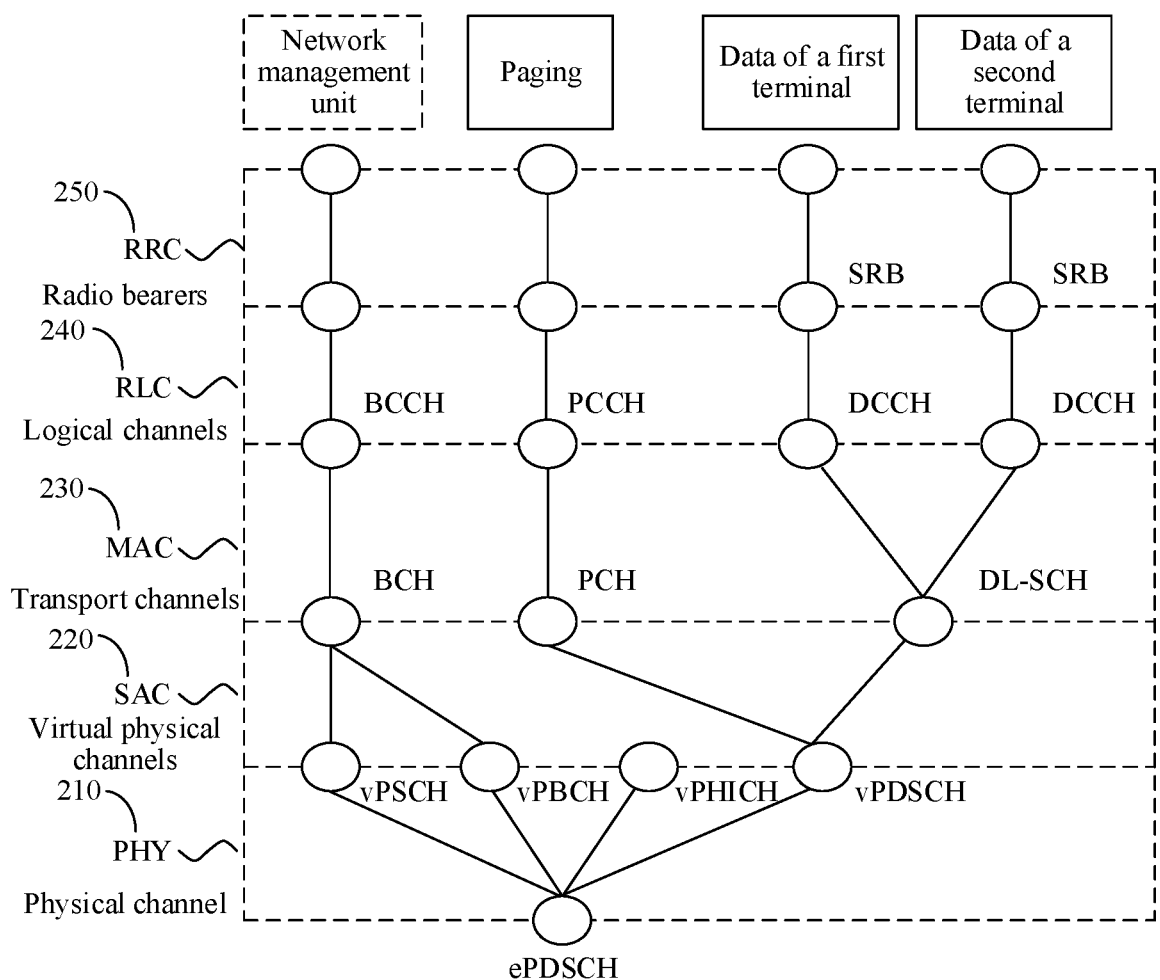
FIG. 2 is a schematic architecture diagram of an eIoT system to which an embodiment of this application is applicable.

FIG. 2 is a schematic architecture diagram of an eIoT system to which an embodiment of this application is applied. Similar to an LTE system, the eIoT system includes a radio bearer (Radio Resource Control, RRC) layer, a radio link control (Radio Link Control, RLC) layer, a media access control (Media Access Control, MAC) layer, a service adaptation control (Service Adaptation Control, SAC) layer, and a physical layer (Physical Layer, PHY). Main functions of the RRC layer are to allocate a radio resource and send related signaling. Control signaling between UE and a universal mobile telecommunications system terrestrial radio access network (UMTS Terrestrial Radio Access Network, UTRAN) is mainly an RRC message. The RRC message carries all parameters required for establishing, modifying, and releasing layer 2 and physical layer protocol entities, and also carries some network attached storage (Network Attached Storage, NAS) signaling. A main function of the RLC layer is to provide segmentation and retransmission services for a user and control data. The MAC layer is mainly responsible for controlling and connecting physical media at the physical layer. The SAC layer is mainly responsible for controlling frequency hopping. Main functions of the PHY layer are to establish, maintain, and cancel a physical connection. Currently, downlink control channels supported by eIoT include a virtual physical shared channel (Virtual Physical Shared Channel, vPSCH), a virtual physical broadcast channel (Virtual Physical Broadcast Channel, vPBCH), and a virtual physical HARQ indicator channel (Virtual Physical Hybrid Indicator Channel, vPHICH), and a virtual physical downlink shared channel (Virtual Physical Downlink Shared Channel, vPDSCH); and an uplink channel supported by the eIoT includes a virtual physical uplink shared channel (Virtual Physical Uplink Shared Channel, vPUSCH). Compared with an LTE system architecture, the eIoT system does not support a physical downlink control channel (Physical Downlink Control Channel, PDCCH). To be specific, there is no scheduling indication information, and a terminal sends uplink data based on a slotted aloha (slotted Aloha) mechanism.

In the foregoing system, currently, a network side can send a command to a terminal only in unicast mode. Consequently, when there are a large quantity of terminals, efficiency is comparatively low. In view of this, the embodiments of this application provide technical solutions for implementing multicast in an unlicensed spectrum system. Group configuration is performed on terminals, and a message for each terminal group is sent in multicast mode.

Figure 3:
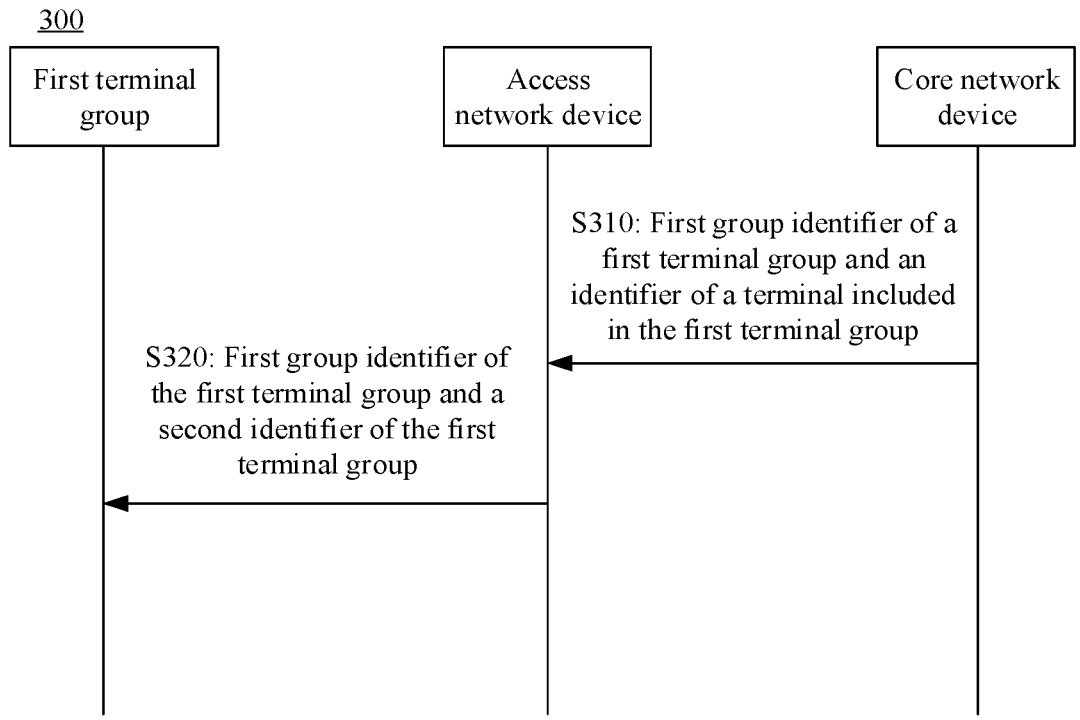
FIG. 3 is a schematic interaction diagram of a communication method according to an embodiment of this application.

FIG. 3 is a schematic interaction diagram of a communication method according to an embodiment of this application. In the embodiment shown in FIG. 3, an access network device notifies a terminal of a group configuration.

S310: A core network device sends a first group identifier of a first terminal group and an identifier of a terminal included in the first terminal group to the access network device.

In this embodiment of this application, a network side groups terminals. Optionally, the core network device may group the terminals according to a service requirement. For example, terminals associated with a same service are classified into one group, and a first group identifier, for example, a group international mobile subscriber identity (Group International Mobile Subscriber Identification Number, G-IMSI), of the terminal group is allocated. After allocating the first group identifier of the first terminal group, the core network device sends the first group identifier to the access network device.

The identifier of the terminal included in the first terminal group may be an international mobile subscriber identity (International Mobile Subscriber Identification Number, IMSI), a radio network temporary identifier (Radio Network Temporary Identity, RNTI), or the like. The terminal included in the group may be determined based on the identifier.

S320: The access network device sends the first group identifier and a second group identifier to the first terminal group.

In addition to the first group identifier, the group configuration may further include the second group identifier, for example, a group radio network temporary identifier (Group Radio Network Temporary Identity, G-RNTI).

Optionally, the second group identifier may be allocated by the core network device. In this case, the access network device receives the first group identifier and the second group identifier from the core network device. Alternatively, the second group identifier may be allocated by the access network device. In this case, the access network device receives the first group identifier from the core network device, and allocates the second group identifier to the first terminal group.

The first group identifier and the second group identifier are used to indicate a paging occasion (Paging Occasion, PO) for the first terminal group, and a paging message for the first terminal group is transmitted on a first physical channel.

The paging occasion for the first terminal group is used to send the paging message for the first terminal group. In other words, a paging message (multicast message) for one terminal group may be sent on a paging occasion indicated by a first group identifier and a second group identifier of the terminal group. In this way, the paging message can be sent in multicast mode, and system efficiency is improved.

Optionally, after allocating the second group identifier of the first terminal group, the access network device notifies terminals included in the first terminal group one by one.

Optionally, after allocating the second group identifier of the first terminal group, the access network device notifies terminals included in the first terminal group through broadcasting.

Optionally, after allocating the second group identifier of the first terminal group, the access network device sends the second group identifier to the core network device.

In this embodiment of this application, the first physical channel is a channel resource, for example, a vPDSCH, for the paging message for the first terminal group. The first physical channel may be configured in a plurality of manners, for example, allocated by the access network device, or agreed on in a protocol. It should be understood that the first physical channel may be a virtual physical channel.

Optionally, the access network device sends an identifier of the first physical channel to the terminal included in the first terminal group.

After allocating the first physical channel, the access network device may notify the terminals in the group one by one.

Optionally, the access network device broadcasts an association relationship between the first terminal group and the first physical channel.

After allocating the first physical channel, the access network device may alternatively notify the terminals in the group through broadcasting.

In addition, after allocating the first physical channel, the access network device may alternatively send the identifier of the first physical channel to the core network device, and the core network device notifies the terminals in the group.

Optionally, the first physical channel is agreed on in advance.

For example, the first physical channel may be fixed, or the association relationship between the first terminal group and the first physical channel is agreed on in advance. In this way, the terminal may learn of the first physical channel according to an agreement, and the network side does not need to allocate the first physical channel.

The paging occasion for the first terminal group may be determined based on the first group identifier and the second group identifier of the first terminal group. Optionally, the paging occasion for the first terminal group may be used for a terminal in idle mode in the first terminal group.

Optionally, the core network device may further configure a priority of the first terminal group. The priority is used to determine whether the paging message for the first terminal group is preferentially transmitted on the paging occasion. When the priority is configured, the core network device sends the priority of the first terminal group to the access network device.

When a terminal joins a plurality of terminal groups, the terminal may determine, based on priority information, to preferentially receive a paging message corresponding to a terminal group. For example, a first terminal joins, according to different service requirements, three terminal groups, namely, the first terminal group whose priority is 3, a second terminal group whose priority is 2, and a third terminal group whose priority is 1. It is specified that a smaller priority value indicates a higher priority. In this case, the first terminal preferentially receives a paging message corresponding to the third terminal group.

Optionally, after receiving the priority that is of the first terminal group and that is sent by the core network device, the access network device sends the priority of the first terminal group to the terminal included in the first terminal group.

Optionally, after receiving the priority that is of the first terminal group and that is sent by the core network device, the access network device notifies the first terminal group through broadcasting.

Optionally, the access network device sends the paging message on the paging occasion over the first physical channel based on the priority of the first terminal group.

Optionally, the access network device may further configure a modulation and coding scheme used for the paging message for the first terminal group, and send, to the terminal included in the first terminal group, the modulation and coding scheme used for the paging message for the first terminal group.

Optionally, the access network device broadcasts the modulation and coding scheme used for the paging message for the first terminal group.

The following uses a G-RNTI and a G-IMSI as an example to describe a manner of calculating a paging occasion. It should be understood that this is merely intended to facilitate understanding of the technical solutions in the embodiments of this application, and should not be understood as a limitation on the embodiments of this application.

Specifically, in an eIoT system, a paging message is carried on an enhanced physical downlink shared channel (Enhance Physical Downlink Shared Channel, ePDSCH), and shares the PDSCH channel with service data and other signaling. Therefore, overheads of the paging message need to be strictly controlled, and flexibility is also required. In view of this, a paging frame eFrame is designed. The paging frame is a radio frame that carries the paging message. eIoT defines six types of paging frame densities. A cycle of the paging frame is a discontinuous reception (Discontinuous Reception, DRX) cycle. For example, the cycle of the paging frame (Paging Frame, PF) is 32 eFrames, and another possible cycle is 64 eFrames, 128 eFrames, or 256 eFrames. The paging frame density is a percentage of paging frames in radio frames in each DRX cycle, namely, 1, ½, ¼, ⅛, 1/16, or 1/32. A lower paging frame density indicates lower paging overheads. However, paging congestion caused by an insufficient paging capability needs to be avoided. The paging congestion causes an increase in a call latency and affects user experience. A higher paging frame density indicates a shorter paging latency and better user experience, but higher paging overheads.

A paging occasion PO is a subframe that is in the paging frame and that carries the paging information. A paging occasion density is referred to as Ns. A value of Ns is related to a size of the paging information CBS.

As described above, the paging information is sent on the ePDSCH channel, and a sending position of the paging information is determined by the PF and the PO. A calculation procedure is as follows:

(1) Learn of an identifier (UE_ID) of a paged terminal, a DRX cycle T, a quantity N of paging frames in one DRX cycle, a quantity Ns of subframes occupied by paging information in a paging frame, and a size of the paging information CBS from a broadcast message.

(2) Determine, based on UE_ID, N, and T and by using a PF calculation formula, an SFN of an eFrame, namely, the PF, in which the paging information is located.

(3) Determine, based on UE_ID, N, and T and by using a corresponding formula, an index i_s of a paging occasion PO that supports the paging information, and search an eSubFrame pattern table by using the index i_s and CBS to determine a PO.

Two related calculation manners are used as examples herein, but are not specifically limited.

Related calculation formula 1:

$$PF: SFN \bmod T = (T \text{ div } N) \times (UE\_ID \bmod N)$$

$$PO: i\_s = \text{floor}(UE\_ID/N) \bmod Ns$$

where T represents a DRX cycle, measured in eFrames. In other words, the DRX cycle is an integer multiple of an eFrame.

nB: a paging-related configuration parameter, reflecting a paging frame density and measured in eFrames nB: 4T, 2T, T, T/2, T/4, T/8, T/16, and T/32

N: a quantity of eFrames corresponding to one paging frame, where N=min(T, nB)

Ns: a quantity of paging subframes in one paging frame, related to a value of CBS Ns: max(1, nB/T)

CBS: a size of a transport block, namely, a quantity of eSubFrames occupied by one paging message UE_ID: IMSI mod 1024

TABLE 1

| CBS (eSubFrame) | Quantity of paging messages that can be transmitted in one eFrame | Paging occasion density Ns | PO when i_s = 0 | PO when i_s = 1 | PO when i_s = 2 | PO when i_s = 3 |
| --- | --- | --- | --- | --- | --- | --- |
| 1 | 6 | 1 | 0 | N/A | N/A | N/A |
|   |   | 2 | 0 | 3 | N/A | N/A |
|   |   | 4 | 0 | 2 | 3 | 5 |
| 2 | 3 | 1 | 0 | N/A | N/A | N/A |
|   |   | 2 | 0 | 3 | N/A | N/A |
| 3 | 1 |   | 0 | N/A | N/A | N/A |
| 4 | 1 |   | 0 | N/A | N/A | N/A |
| 5 | 1 |   | 0 | N/A | N/A | N/A |
| 6 | 1 |   | 0 | N/A | N/A | N/A |

It should be understood that, by default herein, when CBS corresponding to the paging message is less than a quantity of eSubFrames that can be provided by the eFrame (correspondingly, CBS=4, 5, and 6 eSubFrames), a PO position starts from the first eSubFrame in the eFrame, and the start position of the PO in this case may be subsequently changed, and the TDD eSubFrame patterns table is modified in this case.

For example, the DRX cycle T is 120 eFrames, namely, T=120×1.5s=180s, CBS=1 subFrame, and nB=4T Quantity of paging frames in one DRX cycle: N=min(T, nB)=min(T, 4T)=T=120 eFrames

IMSI: 404685505601234

UE ID: 404685505601234 mod 1024=722

CBS=2; Ns=max(1, nB/T)=max(1, 4T/T)=4

SFN mod T=(T div N)×(UE_ID mod N)=(T/T)×(722 mod 120) =1×2=2

In other words, SFN mod 120=2, . . . , SFN=2, 122, 242, . . . .

i_s=floor(UE_ID/N) mod Ns=floor(722/120) mod 4=12 mod 4=0

It can be learned by querying the table that, when CBS=1 and i_s=0, PO=0, that is, the PO is a position of the first eSubFrame in an eFrame.

Related calculation formula 2:

In the foregoing TDD eSubFrame patterns table, it is assumed that a paging occasion density Ns is less than a quantity of paging messages in one eFrame, or it may be assumed that Ns is a maximum quantity of paging messages that can be accommodated in the eFrame.

Ns=floor(6/CBS)

i_s=floor(UE_ID/N) mod Ns

In this case, a subframe position of a PO in TDD mode is shown in Table 2, namely, TDD eSubFrame pattern.

In the embodiment shown in FIG. 3, the access network device notifies the terminal of the group configuration. Optionally, the group configuration may alternatively be notified by the core network device to the terminal. The following provides descriptions with reference to FIG. 4. It should be understood that, in addition to the following descriptions, for the following embodiments, further refer to related descriptions in the foregoing embodiments. For brevity, details are not described below again.

Figure 4:
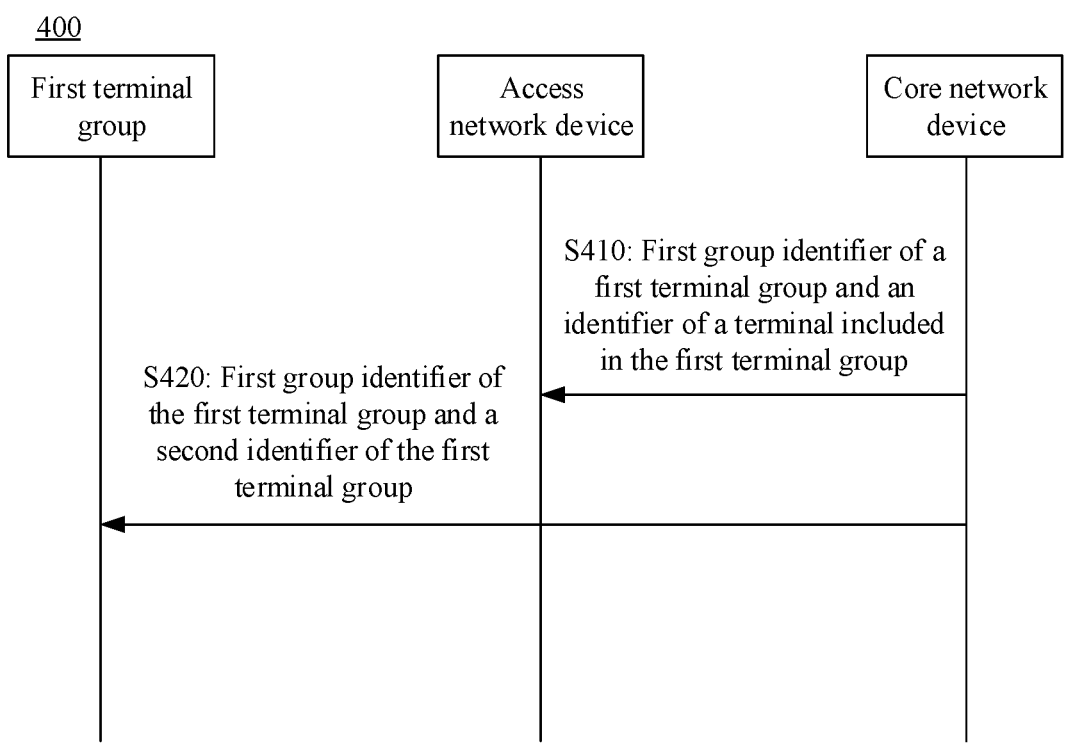
FIG. 4 is a schematic interaction diagram of a communication method according to another embodiment of this application.

FIG. 4 is a schematic interaction diagram of a communication method according to an embodiment of this application. Specifically, a core network device notifies a terminal of a group configuration.

S410: The core network device sends a first group identifier of a first terminal group to an access network device.

In this embodiment of this application, the core network device allocates the first group identifier of the first terminal group. After allocating the first group identifier of the first terminal group, the core network device sends the first group identifier to the access network device.

S420: The core network device sends the first group identifier of the first terminal group and a second identifier of the first terminal group to a terminal included in the first terminal group.

Optionally, the second group identifier may be allocated by the core network device. In this case, the core network device directly sends the first group identifier and the second group identifier to the access network device, and sends the first group identifier and the second group identifier to the terminal included in the first terminal group. Alternatively, the second group identifier may be allocated by the access network device. In this case, the core network device sends the first group identifier to the access network device, receives the second group identifier from the access network device, and then sends the first group identifier and the second group identifier to the terminal included in the first terminal group. The first group identifier and the second

TABLE 2

| CBS (eSubFrame) | Paging occasion density Ns (floor(6/Ns)) | PO when i_s = 0 | PO when i_s = 1 | PO when i_s = 2 | PO when i_s = 3 | PO when i_s = 4 | PO when i_s = 5 |
| --- | --- | --- | --- | --- | --- | --- | --- |
| 1 | 6 | 0 | 1 | 2 | 3 | 4 | 5 |
| 2 | 3 | 0 | 2 | 4 | N/A | N/A | N/A |
| 3 | 2 | 0 | 3 | N/A | N/A | N/A | N/A |
| 4 | 1 | 0 | N/A | N/A | N/A | N/A | N/A |
| 5 | 1 | 0 | N/A | N/A | N/A | N/A | N/A |
| 6 | 1 | 0 | N/A | N/A | N/A | N/A | N/A | group identifier are used to indicate a paging occasion for the first terminal group, and a paging message for the first terminal group is transmitted on a first physical channel.

Optionally, the core network device receives an identifier of the first physical channel from the access network device, and the core network device sends the identifier of the first physical channel to the terminal included in the first terminal group.

Optionally, an association relationship between the first terminal group and the first physical channel is broadcast in an area served by the access network device.

Optionally, the first physical channel may be agreed on in advance.

Optionally, the core network device sends a priority of the first terminal group to the access network device; and the core network device sends the priority to the terminal included in the first terminal group, or the priority is broadcast in the area served by the access network device.

The priority may be used to determine whether the paging message for the first terminal group is preferentially transmitted on the paging occasion. The paging occasion may be determined based on the first group identifier and the second group identifier of the first terminal group.

Optionally, the core network device receives, from the access network device, a modulation and coding scheme used for the paging message for the first terminal group; and the core network device sends the modulation and coding scheme to the terminal included in the first terminal group, or the modulation and coding scheme used for the paging message for the first terminal group is broadcast in the area served by the access network device.

Optionally, the core network device may further maintain a terminal group. For example, the core network device may cancel a terminal group or remove any terminal from a terminal group according to a service requirement. The following provides descriptions with reference to FIG. 5.

Figure 5:
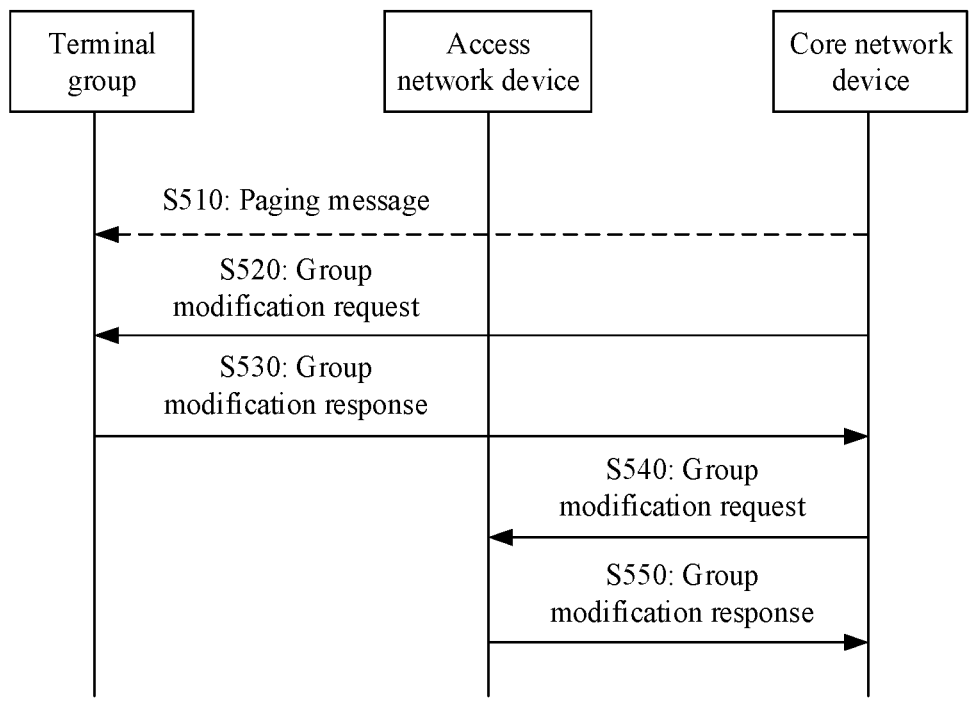
FIG. 5 is a schematic interaction diagram of a communication method according to still another embodiment of this application.

FIG. 5 is a schematic diagram of a communication method according to still another embodiment of this application;

S510: A core network device sends a paging message to some or all terminals included in a first terminal group.

The core network device does not know whether the terminals included in the first terminal group is in connected mode or idle mode. A terminal in idle mode can receive a message only after being woken up. Therefore, herein, the paging message is sent to the terminals included in the first terminal group, to wake up the terminal in idle mode to prepare to receive a group modification request message.

S520: The core network device sends a group modification request message to the terminal group.

When the group needs to be modified, an access network device sends the group modification request message to a corresponding terminal.

S530: The terminal in the terminal group sends a group modification response to the core network device, to notify the core network device that the terminal has received the group modification request message.

Optionally, the core network device may further instruct the access network device to modify the terminal group. For example, when modification of the terminal group affects sending of a paging message by the access network device, the following steps may be further performed.

S540: The core network device sends a group modification request message to the access network device.

Specifically, the access network device instructs, over a u-S1 interface, the access network device to modify the group.

S550: The access network device sends a group modification response to the core network device.

Specifically, after receiving the group modification message, the access network device modifies the group and sends the group modification response to the core network device.

In various embodiments of this application, more than one of the first group identifier, the second group identifier, the first physical channel, the priority of the terminal group, and the modulation and coding scheme may be sent in a same message, or may be sent in different messages. For example, more than one of the first group identifier, the second group identifier, the first physical channel, the priority of the terminal group, and the modulation and coding scheme may be sent in a same group configuration message. However, this is not limited in the embodiments of this application.

Figure 6:
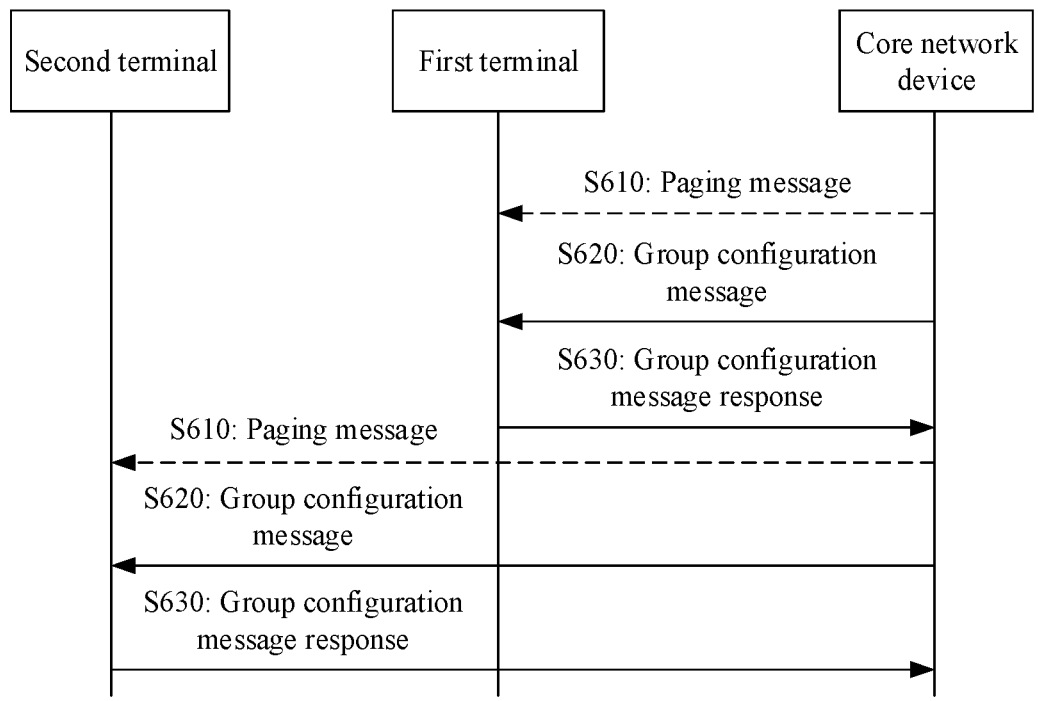
FIG. 6 is a schematic interaction diagram of a communication method according to yet another embodiment of this application.

FIG. 6 is a schematic interaction diagram of a communication method according to yet another embodiment of this application. Specifically, FIG. 6 is a schematic interaction diagram in which a core network device sends a group configuration message to a terminal included in a first terminal group. Herein, an example in which the first terminal group includes two terminals, namely, a first terminal and a second terminal, is used for description. A case of a plurality of terminals is obtained by analogy. This is not specifically limited herein.

S610: The core network device sends a paging message to each of a first terminal and a second terminal that are in a same terminal group.

It should be understood that the core network device does not know whether the terminals included in the terminal group are in connected mode or idle mode. A terminal in idle mode can receive a message only after being woken up. Therefore, herein, the core network device sends the paging message to each of the first terminal and the second terminal, to wake up the terminal in idle mode.

S620: The core network device sends a group configuration message to each of the first terminal and the second terminal, where the group configuration message is used to indicate the terminal group in which the terminal is located, and the group configuration message includes a group identifier of the terminal group.

Optionally, for a plurality of terminals, the core network device classifies, according to a service requirement, terminals having a same service feature into one group, and after grouping the terminals, the core network device preconfigures identification information of each terminal group.

Optionally, the group identification information of the terminal group includes a first group identifier and a second group identifier. The first group identifier information may be a G-IMSI, and the second group identifier information may be a G-RNTI.

Optionally, the group configuration message includes an agreed-on occasion. The agreed-on occasion is used by an access network device to send a paging message to the terminal group, where the paging message carries control information for the terminal group. The agreed-on occasion may be an occasion directly determined by the core network device and notified to the access network device. The access network device directly sends the paging message to the terminal group on the occasion, where the paging message carries the control information for the terminal group. Alternatively, the core network device, the access network device, and the terminal group agree on an occasion after a plurality of times of negotiation. The access network device sends the paging message to the terminal group on the agreed-on occasion. The agreed-on occasion is not specifically limited herein.

Optionally, the group configuration message includes priority information of the terminal group. When a terminal joins a plurality of terminal groups, the terminal determines, based on priority information, to preferentially join a terminal group, that is, to preferentially receive a paging message corresponding to a terminal group, where the paging message carries control information for the terminal group. For example, the first terminal joins, according to different service requirements, three terminal groups, namely, a first terminal group whose priority is 3, a second terminal group whose priority is 2, and a third terminal group whose priority is 1. It is specified that a smaller priority value indicates a higher priority. In this case, and the first terminal preferentially receives a paging message corresponding to the third terminal group.

Optionally, the group configuration message includes a first physical channel for the terminal group. The access network device sends a paging message for the first terminal group to a terminal on a transmission occasion over the first physical channel. Similarly, the terminal receives the paging message, for the first terminal group, sent by the access network device on the transmission occasion over the first physical channel. The channel resource may be a vPDSCH resource.

Optionally, the first physical channel may be a channel agreed on in a communications standard, a channel allocated by the access network device and broadcast by the access network device to terminals, a channel allocated by the access network device and notified by the access network device to terminals in a terminal group one by one, or a channel allocated by the access network device, sent to the core network device, and notified by the core network device to terminals one by one.

Optionally, the group configuration message includes a modulation and coding scheme for the terminal group.

S630: After receiving the group configuration message, the first terminal and the second terminal each send a group configuration message response to the core network device.

In the foregoing embodiments, the technical solution of terminal group configuration is described. According to the technical solution in the foregoing embodiments, a paging message for a terminal group can be sent, and system efficiency can be improved.

Optionally, the paging message for the terminal group may further include control information for the terminal group, so that the control information can be sent in multicast mode, and system efficiency is improved.

The embodiments of this application further provide a technical solution for transmitting a paging message for a terminal group. The following provides specific descriptions. It should be understood that the technical solution of the group configuration in the foregoing embodiments may be used in the following embodiments. For example, the technical solution in the foregoing embodiments may be first used to perform terminal group configuration, and then the technical solution in the following embodiments may be used to transmit a paging message for a terminal group. However, this is not limited in the embodiments of this application.

Figure 7:
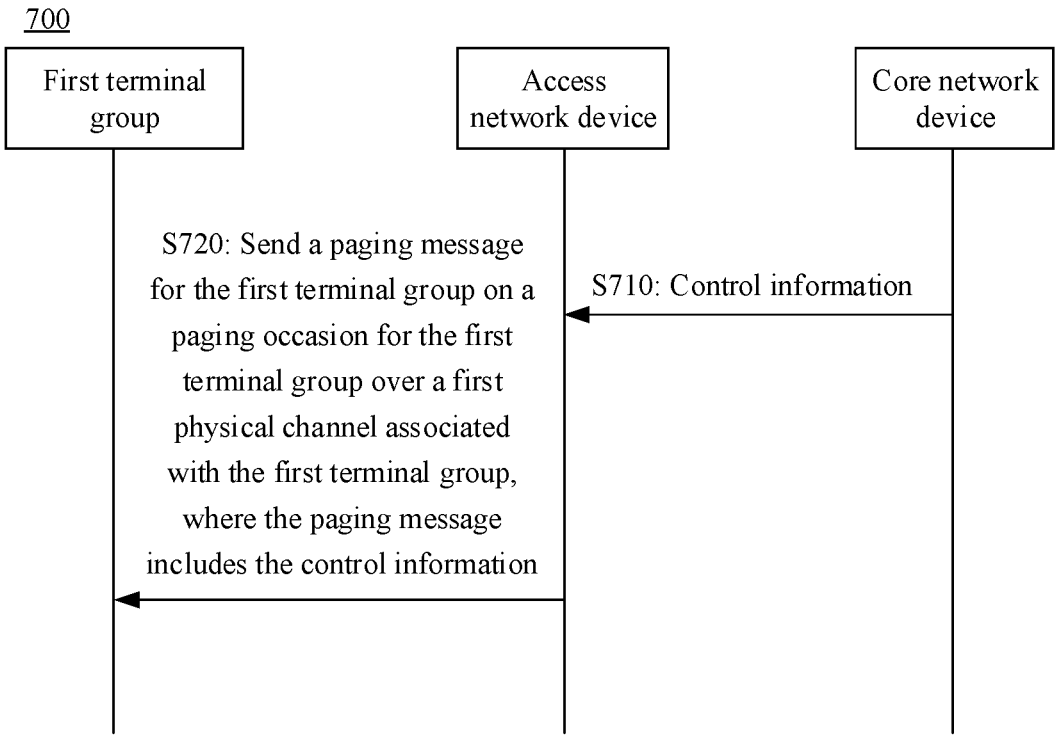
FIG. 7 is a schematic interaction diagram of a communication method according to still yet another embodiment of this application.

FIG. 7 is a schematic interaction diagram of a communication method according to still yet another embodiment of this application.

S710: A core network device sends control information for a first terminal group to an access network device.

S720: The access network device sends a paging message for the first terminal group on a paging occasion for the first terminal group over a first physical channel associated with the first terminal group, where the paging message includes the control information.

The paging occasion is determined by a first group identifier and a second group identifier of the first terminal group, and the paging message carries the second group identifier.

Specifically, when control information needs to be sent to a terminal group, for example, the first terminal group, the core network device sends the control information for the first terminal group to the access network device. The access network device sends, over the first physical channel associated with the first terminal group, the paging message for the first terminal group on the paging occasion that is for the first terminal group and that is determined based on the first group identifier and the second group identifier of the first terminal group, where the paging message includes the control information. In this way, the control information can be sent in multicast mode by using the paging message for the first terminal group, so that a sending latency is reduced, and system efficiency is improved.

Optionally, the access network device may send the paging message on the paging occasion over the first physical channel based on a priority of the first terminal group.

Specifically, when a terminal included in the first terminal group joins a plurality of terminal groups, paging messages corresponding to the plurality of terminal groups conflict, and the access network device determines, based on priorities of the terminal groups, to preferentially send a paging message corresponding to a terminal group having a higher priority. The terminal may determine, based on the priorities, to preferentially receive the paging message corresponding to the terminal group having the higher priority. For example, a first terminal joins, according to different service requirements, three terminal groups, namely, the first terminal group whose priority is 3, a second terminal group whose priority is 2, and a third terminal group whose priority is 1. It is specified that a smaller priority value indicates a higher priority. In this case, the first terminal preferentially receives a paging message corresponding to the third terminal group.

Optionally, the paging message is scrambled by using the second group identifier; or a MAC header of the paging message includes the second group identifier.

Specifically, manners of sending the paging message for the first terminal group herein include but are not limited to the following:

Manner 1: The access network device sends the paging message to the first terminal group on the paging occasion, where the paging message carries the second group identifier and the control information for the first terminal group, and the second group identifier may be a G-RNTI. For example, the MAC header of the paging message may include the second group identifier. Therefore, the paging message that carries the control information is sent to the first terminal group.

Manner 2: The access network device sends the paging message to the first terminal group on the paging occasion, where the paging message carries the control information scrambled by using the second group identifier. The access network device broadcasts the paging message to a plurality of terminals. Only a terminal having the second group identifier can descramble the control information scrambled by using the second group identifier, and finally obtain the control information corresponding to the first terminal group.

Optionally, after receiving the control information sent by the core network device, the access network device temporarily buffers the control information. The access network device may determine a terminal in idle mode based on identification information of the terminal, and calculate a paging occasion for the terminal in idle mode based on group identification information, for example, based on a G-RNTI and a G-IMSI, and sends the paging message to the first terminal group on the paging occasion. The paging message carries the control information for the first terminal group.

Optionally, the access network device sends a control message to a terminal in connected mode in a terminal group in unicast mode, where the control message carries the control information. The access network device may determine, based on identification information of a terminal included in the terminal group, the terminal in connected mode in the terminal group.

Optionally, the access network device may send the control information to a terminal in idle mode in a terminal group in multicast mode on a paging occasion. For a terminal in connected mode in the terminal group, the access network device may send the control information in unicast mode.

Specifically, the access network device searches, based on the G-RNTI, for identification information of a terminal included in the terminal group, finds the terminal in connected mode in the terminal group based on the identification information of the terminal, and directly delivers a group paging message. A MAC layer is indicated by directly using the identification information RNTI of the terminal.

Optionally, an occasion on which a paging message is sent may be the paging occasion for the first terminal group or an agreed-on occasion.

Optionally, an occasion on which a paging message is sent may be an agreed-on occasion. The agreed-on occasion may be an occasion directly determined by the core network device and notified to the access network device. The access network device directly sends the paging message to the first terminal group on the occasion, where the paging message carries the control information for the first terminal group. Alternatively, the core network device, the access network device, and the first terminal group agree on an occasion after negotiation. The access network device sends the paging message to the first terminal group on the agreed-on occasion. The agreed-on occasion is not specifically limited herein.

Optionally, a terminal supports receiving of both a paging message and the paging message for the first terminal group. When the paging message and the paging message for the first terminal group are simultaneously sent, the terminal preferentially receives the paging message.

Optionally, the core network device needs to maintain a terminal group according to a service requirement. The core network device may cancel a terminal group or remove a terminal from a terminal group according to the service requirement. The terminal receives a group exit request sent by the core network device, and determines, based on the group exit request from the core network device, to exit the terminal group. Optionally, the core network device sends a paging message to a terminal, to wake up a terminal in idle mode to receive a message. After sending the paging message, the core network device sends a group exit request to the terminal, to notify a terminal group that needs to be canceled or some terminals in the terminal group. The terminal determines, based on the group exit request, the terminal group that the terminal needs to exit. The terminal sends a group exit response to the core network device, where the response may be used to notify the core network device that the terminal receives the group exit request message. The core network device sends a group modification request to the access network device, where the group modification request is used by the access network device to modify a terminal group. The access network device receives the group modification request sent by the core network device, and modifies the terminal group based on the group modification request. Specifically, the group modification request is used to instruct the access network device to cancel a terminal group or remove a terminal from a terminal group. After completing modification for the terminal group, the access network device returns a group modification response to the core network device.

Figure 8:
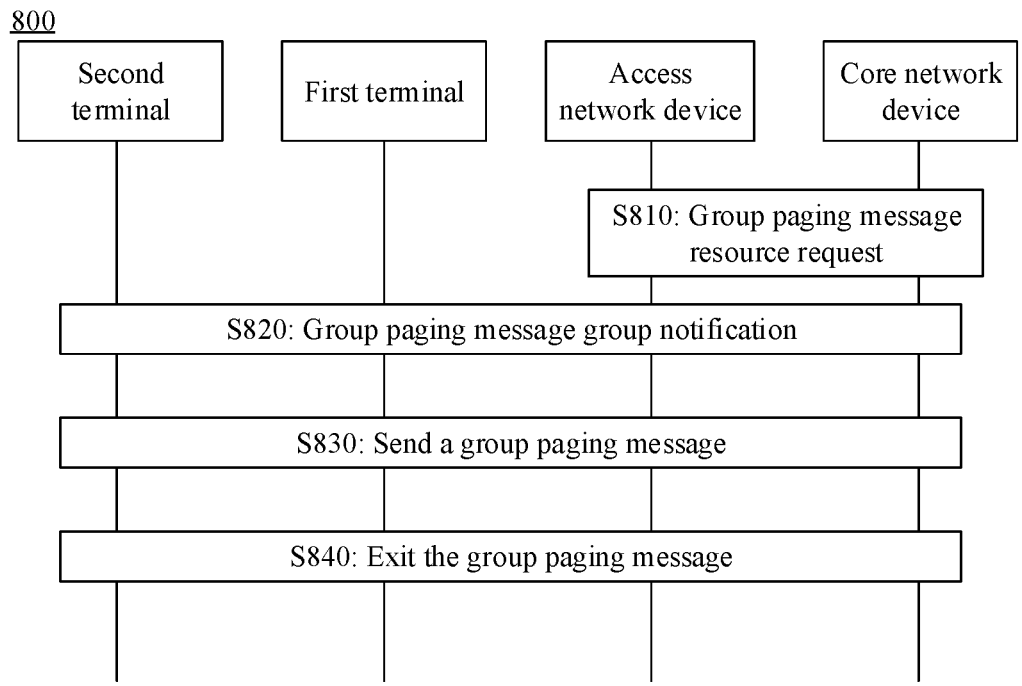
FIG. 8 is a schematic interaction diagram of a communication method according to a further embodiment of this application.

FIG. 8 is a schematic diagram of a communication method according to a further embodiment of this application. For example, FIG. 8 may be a flowchart of group paging in an eIoT system. It should be understood that, this embodiment may include the grouping configuration processes in FIG. 3 to FIG. 6 and the process of sending the control information in FIG. 7. In other words, the grouping configuration and sending the control information for the first terminal group may be implemented in a same procedure. FIG. 8 is merely an example, and does not constitute a limitation on the embodiments of this application. In addition, the following steps may be organically combined.

S810: A core network device sends a group paging message resource request to an access network device. The request may be a first group configuration message. The first group configuration message is used to indicate a terminal group, and the first group configuration message includes group identification information of the terminal group.

Optionally, the core network device groups, according to service requirements of terminals, terminals having a same service feature, and configures group identification information.

Optionally, the identification information of the terminal group includes first group identifier information and second group identifier information. The first group identifier information may be a G-IMSI, and the second group identifier information may be a G-RNTI.

Optionally, the first group configuration message further includes an agreed-on occasion. The agreed-on occasion is used by the access network device to send a control message to the terminal group on the agreed-on occasion in multicast mode, where the control message carries control information for the terminal group.

Optionally, the first group configuration message further includes identification information of a terminal included in the terminal group. The access network device determines, based on the identification information of the terminal included in the terminal group, a terminal specifically included in the terminal group, and determines, based on the identification information of the terminal included in the terminal group, a terminal in connected mode and a terminal in idle mode in the terminal group.

Optionally, the first group configuration message further includes a channel resource request. The access network device determines a channel resource for the terminal group based on the first group configuration message. The access network device may send a group paging channel resource response to the core network device, where the response carries an allocated channel resource occupied by a group paging message and an MCS for the group paging message.

Optionally, the core network device sends the group paging message resource request to the access network device by using a u-S1AP message.

Optionally, the channel resource may be a vPDSCH resource.

S820: The core network device sends a group paging message group notification to a terminal included in the terminal group. Specifically, the core network device sends a second group configuration message to the terminal included in the terminal group. The second group configuration message is used to indicate the terminal group in which the terminal is located, and the second group configuration message includes the group identification information of the terminal group. An example in which a terminal group includes a first terminal and a second terminal is used herein. A case in which the group includes a plurality of terminals is obtained by analogy. This is not specifically limited.

The terminal receives, on a transmission occasion based on the group identification information, the control message sent by the access network device in multicast mode, where the control message carries the control information for the terminal group.

Optionally, the identification information of the terminal group includes first group identifier information and second group identifier information. The first group identifier information may be a G-IMSI, and the second group identifier information may be a G-RNTI.

Optionally, the transmission occasion is an agreed-on occasion, and the second group control message includes the agreed-on occasion. The agreed-on occasion may be an occasion directly determined by the core network device or the access network device and notified to the access network device, or an occasion finally determined by the core network device, the access network device, and the terminal after negotiation. The access network device sends the control message to the terminal on the occasion in multicast mode.

Optionally, the transmission occasion may be a paging occasion corresponding to the terminal group. The paging occasion may be determined based on the first group identifier information and the second group identifier information.

S830: Send a group paging message to the terminal group.

Specifically, the core network device sends a first control message to the access network device, where the first control message carries control information for the terminal group. The access network device sends a second control message on the transmission occasion in multicast mode based on the group identification information, where the second control message carries the control information.

Optionally, the access network device sends the second control message to the terminal group on the transmission occasion in multicast mode in two different manners.

Manner 1: The access network device sends the second control message to the terminal group on the transmission occasion in multicast mode, where the second control message carries the control information and the first group identifier information.

Manner 2: The access network device sends the second control message to the terminal group on the transmission occasion in multicast mode, where the second control message carries the control information scrambled by using the first group identifier information. Specifically, all the plurality of terminals can receive the second control message, and perform descrambling on the received second control message by using the first group identifier information obtained by the plurality terminals. If the descrambling succeeds, the control information in the second control message is obtained. If the descrambling fails, it indicates that the second control message is not sent to the terminal.

Optionally, the transmission occasion may be determined based on the first group identifier information and the second group identifier information.

Optionally, the transmission occasion may be an agreed-on occasion, and the first group configuration message and the second group configuration message may further include the agreed-on occasion.

Optionally, the access network device sends a third control message to a terminal in connected mode in the terminal group in unicast mode, where the third control message carries the control information. The access network device may determine, based on the identification information of the terminal included in the terminal group, the terminal in connected mode in the terminal group.

S840: Exit the group paging message.

The core network device may cancel the terminal group or remove a terminal from the terminal group according to a service requirement.

Specifically, the core network device sends a group paging exit request to the terminal included in the terminal group. The core network device receives a group paging exit response sent by the terminal. The core network device sends a group modification request to the access network device, where the group modification request is used by the access network device to modify the terminal group.

It should be understood that various implementations of the embodiments of this application may be separately implemented or jointly implemented. This is not limited in the embodiments of this application. For example, the embodiment of transmitting the paging message for the terminal group may be based on the embodiment of the terminal group configuration, or may not be based on the embodiment of the terminal group configuration.

It should be understood that the specific examples in the embodiments of this application are merely intended to help a person skilled in the art better understand the embodiments of this application, rather than limit the scope of the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the communication methods according to the embodiments of this application, and the following describes communications device according to the embodiments of this application.

Figure 9:
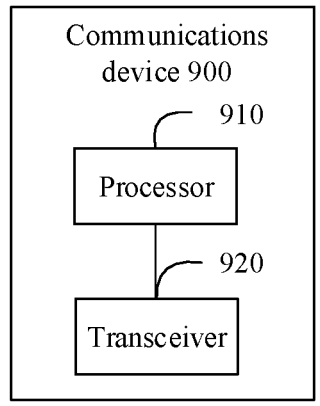
FIG. 9 is a schematic block diagram of a communications device according to an embodiment of this application.

FIG. 9 is a schematic diagram of a communications device according to an embodiment of this application. The communications device may correspond to the access network device in each method embodiment, and may have any function of the access network device in the method. As shown in FIG. 9, the communications device includes a processor 910 and a transceiver 920.

Optionally, the transceiver 920 may be referred to as a remote radio unit (remote radio unit, RRU), a transceiver unit, a transceiver, a transceiver circuit, or the like. The transceiver 920 may include at least one antenna and a radio frequency unit. The transceiver 920 may be configured to transmit and receive radio frequency signals, and perform conversion between a radio frequency signal and a baseband signal.

Optionally, the communications device may include a baseband unit (baseband unit, BBU), and the baseband unit includes the processor 910. The baseband unit may be configured to perform baseband processing such as channel coding, multiplexing, modulation, or spectrum spreading, and control the network device. The transceiver 920 and the baseband unit may be physically disposed together; or may be physically separated, that is, the network device is a distributed network device.

In an example, the baseband unit may include one or more boards, and the plurality of boards may jointly support a radio access network of a single access standard, or may respectively support radio access networks of different access standards.

In an example, the network device may be divided into one centralized unit (centralized unit, CU) and a plurality of transmission reception points (transmission reception point, TRP)/distributed units (distributed unit, DU). In other words, a bandwidth based unit (bandwidth based unit, BBU) of the network device is reconstructed as DU and CU functional entities.

The baseband unit includes the processor 910. The processor 910 may be configured to control the communications device to perform corresponding operations in the foregoing method embodiments. Optionally, the baseband unit may further include a memory, configured to store a necessary instruction and necessary data.

In an embodiment, the transceiver 920 is configured to receive, from a core network device, a first group identifier of a first terminal group and an identifier of a terminal included in the first terminal group.

The processor 910 is configured to obtain the first group identifier of the first terminal group and the identifier of the terminal included in the first terminal group.

The transceiver 920 is further configured to send the first group identifier and a second group identifier of the first terminal group to the terminal included in the first terminal group. The first group identifier and the second group identifier are used to indicate a paging occasion for the first terminal group, and a paging message for the first terminal group is transmitted on a first physical channel.

In an implementation, the transceiver 920 is configured to receive a first group identifier of a first terminal group and a second group identifier of the first terminal group that are sent by a core network device. The first group identifier and the second group identifier are used to indicate a paging occasion for the first terminal group, and a paging message for the first terminal group is transmitted on a first physical channel.

In an implementation, the transceiver 920 is configured to receive a first group identifier that is of a first terminal group and that is sent by a core network device.

The processor 910 is configured to determine a second group identifier of the first terminal group.

The transceiver 920 is further configured to send the second group identifier of the first terminal group to the core network device. The first group identifier and the second group identifier are used to indicate a paging occasion for the first terminal group, and a paging message for the first terminal group is transmitted on a first physical channel.

Optionally, the access network device receives the second group identifier from the core network device.

Optionally, the access network device allocates the second group identifier to the first terminal group.

Optionally, the access network device determines a first physical channel for the first terminal group.

Optionally, the access network device sends an identifier of the first physical channel to the terminal included in the first terminal group.

Optionally, the access network device broadcasts an association relationship between the first terminal group and the first physical channel.

Optionally, the first physical channel is agreed on in advance.

Optionally, the transceiver 920 is further configured to send a priority of the first terminal group or a modulation and coding scheme used for the paging message for the first terminal group to the terminal included in the first terminal group.

The priority is received from the core network device, and the priority is used to determine whether the paging message for the first terminal group is preferentially transmitted on the paging occasion.

Optionally, the transceiver 920 is further configured to broadcast a priority of the first terminal group or a modulation and coding scheme used for the paging message for the first terminal group.

The priority is received from the core network device, and the priority is used to determine whether the paging message for the first terminal group is preferentially transmitted on the paging occasion.

Optionally, the paging message includes control information for the first terminal group.

In an embodiment, the transceiver 920 is configured to receive control information for a first terminal group from a core network device.

The processor 910 is configured to obtain the control information for the first terminal group.

The transceiver 920 is configured to send a paging message for the first terminal group on a paging occasion for the first terminal group over a first physical channel associated with the first terminal group, where the paging message includes the control information.

The paging occasion is determined by a first group identifier and a second group identifier of the first terminal group, and the paging message carries the second group identifier.

Optionally, the transceiver 920 is specifically configured to send the paging message on the paging occasion over the first physical channel based on a priority of the first terminal group.

Optionally, the paging message is scrambled by using the second group identifier; or a MAC header of the paging message includes the second group identifier.

Optionally, the first group identifier is allocated by the core network device; and the second group identifier is allocated by the core network device or the access network device.

Optionally, an identifier of the first physical channel is sent by the access network device or the core network device to the terminal included in the first terminal group; or an association relationship between the first terminal group and the first physical channel is broadcast in an area served by the access network device; or the first physical channel is agreed on in advance.

Optionally, the priority of the first terminal group is determined by the core network device, and is sent by the core network device or the access network device to the terminal included in the first terminal group or is broadcast by the access network device.

Optionally, a modulation and coding scheme used for the paging message for the first terminal group is determined by the access network device, and is sent by the access network device or the core network device to the terminal included in the first terminal group or is broadcast by the access network device.

Optionally, the transceiver 920 is configured to receive a group modification request sent by the core network device; and the access network device modifies the first terminal group based on the group modification request.

Optionally, the first group identifier may be a G-IMSI.

Optionally, the second group identifier may be a G-RNTI.

Optionally, the first physical channel may be a vPDSCH.

Figure 10:
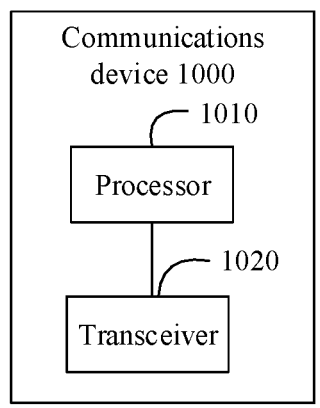
FIG. 10 is a schematic block diagram of a communications device according to another embodiment of this application.

FIG. 10 is a schematic diagram of a communications device according to another embodiment of this application. The communications device may correspond to the core network device in each method embodiment, and may have any function of the core network device in the method. As shown in FIG. 10, the communications device includes a processor 1010 and a transceiver 1020.

In an embodiment, the processor 1010 is configured to obtain a first group identifier of a first terminal group and a second group identifier of the first terminal group.

The transceiver 1020 is configured to send the first group identifier of the first terminal group and the second group identifier of the first terminal group to an access network device; and send the first group identifier and the second group identifier to a terminal included in the first terminal group.

The first group identifier and the second group identifier are used to indicate a paging occasion for the first terminal group, and a paging message for the first terminal group is transmitted on a first physical channel.

In an embodiment, the processor 1010 is configured to obtain a first group identifier of a first terminal group.

The transceiver 1020 is configured to send the first group identifier of the first terminal group to an access network device; receive a second group identifier of the first terminal group from the access network device; and send the first group identifier and the second group identifier to a terminal included in the first terminal group.

The first group identifier and the second group identifier are used to indicate a paging occasion for the first terminal group, and a paging message for the first terminal group is transmitted on a first physical channel.

Optionally, the transceiver 1020 is further configured to receive an identifier of the first physical channel from the access network device, and send the identifier of the first physical channel to the terminal included in the first terminal group.

Optionally, the first terminal group and the first physical channel are agreed on in advance.

Optionally, an association relationship between the first terminal group and the first physical channel is broadcast in an area served by the access network device.

Optionally, the transceiver 1020 is further configured to send a priority of the first terminal group to the access network device; and send the priority to the terminal included in the first terminal group. Alternatively, the priority is broadcast in the area served by the access network device.

The priority is used to determine whether the paging message for the first terminal group is preferentially transmitted on the paging occasion.

Optionally, the transceiver 1020 is further configured to receive a modulation and coding scheme used for the paging message for the first terminal group, and send the modulation and coding scheme to the terminal included in the first terminal group. Alternatively, the modulation and coding scheme used for the paging message for the first terminal group is broadcast in the area served by the access network device.

Optionally, the transceiver 1020 is further configured to send a group exit request to the terminal included in the first terminal group; receive a group exit response sent by the terminal; and send a group modification request to the access network device. The group modification request is used by the access network device to modify the first terminal group.

Optionally, the paging message includes control information for the first terminal group.

Optionally, the first group identifier may be a G-IMSI.

Optionally, the second group identifier may be a G-RNTI.

Optionally, the first physical channel may be a vPDSCH.

Figure 11:
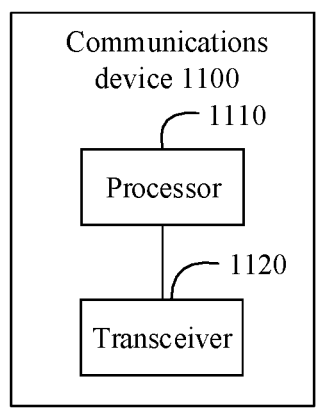
FIG. 11 is a schematic block diagram of a communications device according to still another embodiment of this application.

FIG. 11 is a schematic diagram of a communications device according to still another embodiment of this application. The communications device may correspond to the terminal in each method embodiment, and may have any function of the terminal in the method. As shown in FIG. 11, the communications device includes a processor 1110 and a transceiver 1120.

Optionally, the communications device may further include another main component of the terminal device, for example, a memory or an input/output apparatus.

The processor 1110 may be configured to process a communications protocol and communication data, control the entire communications device, execute a software program, and process data of the software program, for example, configured to support the communications device in performing a corresponding operation in the foregoing method embodiments. The memory is mainly configured to store the software program and the data. After the communications device is powered on, the processor 1110 may read the software program in the memory, interpret and execute an instruction of the software program, and process data of the software program.

In an embodiment, the transceiver 1120 is configured to receive a first group identifier and a second group identifier of a first terminal group that are sent by an access network device or a core network device.

The processor 1110 is configured to determine a paging occasion based on the first group identifier and the second group identifier.

The first group identifier and the second group identifier are used to indicate the paging occasion for the first terminal group, and a paging message for the first terminal group is transmitted on a first physical channel.

Optionally, the first group identifier is allocated by the core network device; and the second group identifier is allocated by the core network device or the access network device.

Optionally, the terminal receives an identifier that is of the first physical channel and that is sent by the core network device or the access network device; or the first physical channel is agreed on in advance; or an association relationship between the first terminal group and the first physical channel is broadcast in an area served by the access network device.

The transceiver 1120 is further configured to receive a priority that is of the first terminal group and that is sent by the core network device; and receive the priority sent by the access network device, or the priority broadcast in the area served by the access network device.

The priority is used to determine whether the paging message for the first terminal group is preferentially transmitted on the paging occasion.

The transceiver 1120 is specifically configured to receive, a modulation and coding scheme that is used for the paging message for the first terminal group and that is sent by the core network device or the access network device, or receive a modulation and coding scheme that is used for the paging message for the first terminal group and that is broadcast in the area served by the access network device.

Optionally, the paging message includes control information for the first terminal group.

In an embodiment, the transceiver 1120 is configured to receive a paging message, sent by an access network device, for a first terminal group on a paging occasion for the first terminal group over a first physical channel associated with the first terminal group, where the paging message includes control information for the first terminal group.

The processor 1110 is configured to determine a paging occasion based on a first group identifier and a second group identifier.

The paging occasion is determined by the first group identifier and the second group identifier of the first terminal group, and the paging message carries the second group identifier.

Optionally, the transceiver 1120 is specifically configured to send the paging message on the paging occasion over the first physical channel based on a priority of the first terminal group.

Optionally, the paging message is scrambled by using the second group identifier; or a MAC header of the paging message includes the second group identifier.

Optionally, the first group identifier is allocated by the core network device; and the second group identifier is allocated by the core network device or the access network device.

Optionally, an identifier of the first physical channel is sent by the access network device or the core network device to a terminal included in the first terminal group; or an association relationship between the first terminal group and the first physical channel is broadcast in an area served by the access network device; or the first physical channel is agreed on in advance.

Optionally, the priority of the first terminal group is determined by the core network device, and is sent by the core network device or the access network device to the terminal included in the first terminal group or is broadcast by the access network device.

Optionally, a modulation and coding scheme used for the paging message for the first terminal group is determined by the access network device, and is sent by the access network device or the core network device to the terminal included in the first terminal group or is broadcast by the access network device.

Optionally, the transceiver 1120 is further configured to receive a group exit request sent by the core network device; and determine, based on the group exit request, to exit the first terminal group.

Optionally, the first group identifier may be a G-IMSI.
Optionally, the second group identifier may be a G-RNTI.
Optionally, the first physical channel may be a vPDSCH.

It should be understood that the processor 910, the processor 1010, or the processor 1110 in the embodiments of this application may be implemented by a processing unit or a chip. Optionally, the processing unit may include a plurality of units in an implementation process.

It should be understood that the transceiver 920, the transceiver 1020, or the transceiver 1120 in the embodiments of this application may be implemented by a transceiver unit or a chip. Optionally, the transceiver 920, the transceiver 1020, or the transceiver 1120 may include a transmitter or a receiver, or may include a transmitting unit or a receiving unit.

It should be understood that in the embodiments of this application, the processor 910 and the transceiver 920 may be implemented by a chip, the processor 1010 and the transceiver 1020 may be implemented by a chip, and the processor 1110 and the transceiver 1120 may be implemented by a chip.

Optionally, a communications device may further include a memory. The memory may store program code. A processor invokes the program code stored in the memory, to implement a corresponding function of the communications device. Optionally, the processor and the memory may be implemented by a chip.

An embodiment of this application further provides a processing apparatus, including a processor and an interface.

The processor is configured to perform the methods in the foregoing embodiments of this application.

The processing apparatus may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in a memory. The memory may be integrated into the processor, or may be located outside the processor and exist independently.

For example, the processing apparatus may be a field-programmable gate array (Field-Programmable Gate Array, FPGA), an application-specific integrated circuit (Application Specific Integrated Circuit, ASIC), a system on chip (System on Chip, SoC), a central processing unit (Central Processor Unit, CPU), a network processor (Network Processor, NP), a digital signal processing circuit (Digital Signal Processor, DSP), a micro controller unit (Micro Controller Unit, MCU), a programmable controller (Programmable Logic Device, PLD), or another integrated chip.

An embodiment of this application further provides a communications device, including a processing unit and a transceiver unit. The processing unit and the transceiver unit may be implemented by software or hardware. When being implemented by hardware, the processing unit may be the processor 910 in FIG. 9, and the transceiver unit may be the transceiver 920 in FIG. 9; or the processing unit may be the processor 1010 in FIG. 10, and the transceiver unit may be the transceiver 1020 in FIG. 10; or the processing unit may be the processor 1110 in FIG. 11, and the transceiver unit may be the transceiver 1120 in FIG. 11.

Figure 12:
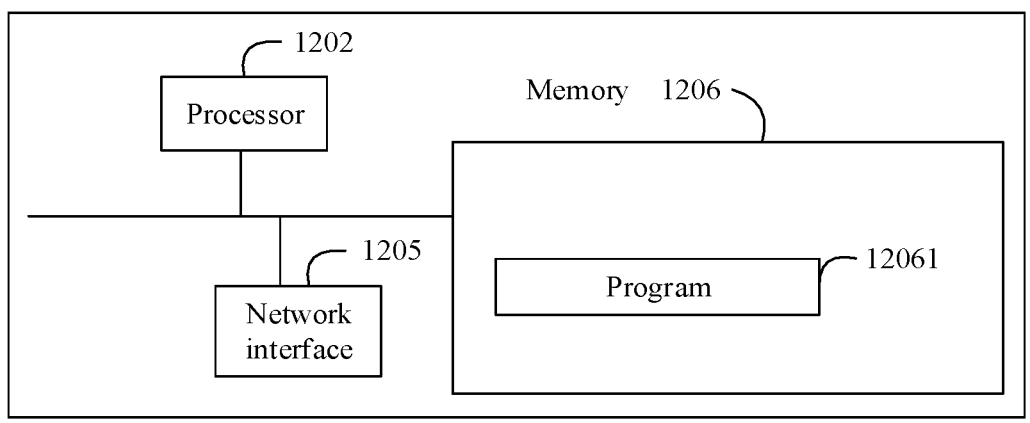
FIG. 12 is a schematic structural diagram of a communications device according to yet another embodiment of this application.

FIG. 12 is a schematic structural diagram of a communications device according to yet another embodiment of this application. The communications device includes at least one processor 1202 (for example, a CPU), at least one network interface 1205 or another communications interface, and a memory 1206. These parts communicate with and are connected to each other. The processor 1202 is configured to execute an executable module, such as a computer program, stored in the memory 1206. The memory 1206 may include a high-speed random access memory (RAM, Random Access Memory), or may include a non-volatile memory (non-volatile memory), for example, at least one magnetic disk memory. A communication connection to at least one other network element is implemented through the at least one network interface 1205 (which may be wired or wireless).

In some implementations, the memory 1206 stores a program 12061, and the processor 1202 executes the program 12061 to perform the methods in the foregoing embodiments of this application.

An embodiment of this application further provides a communications system, including the foregoing terminal, access network device, and core network device.

All or some of the foregoing embodiments may be implemented by software, hardware, firmware, or any combination thereof. When software is used to implement the embodiments, all or some of the embodiments may be implemented in the form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

It should be understood that the term "first", "second", and the like in the embodiments of this application are merely intended to indicate objects, but do not indicate a sequence of corresponding objects.

It should be understood that, the term "and/or" in the embodiments of this application is merely an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the related art, or some of the technical solutions may be implemented in the form of a software product. The computer software product is stored in a storage medium, and includes instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
  receiving, by an access network device from a core network device, a first group identifier of a first terminal group and an identifier of a terminal comprised in the first terminal group; and
  sending, by the access network device, the first group identifier and a second group identifier of the first terminal group to the terminal comprised in the first terminal group; wherein
  the first group identifier and the second group identifier are used to indicate a paging occasion for the first terminal group, and a paging message for the first terminal group is transmitted on a first physical channel, and wherein the paging occasion is a subframe that is in a paging frame and that carries a paging information, and the paging frame is a radio frame that carries the paging message, and wherein the paging occasion for the first terminal group is used to send the paging message for the first terminal group in multicast mode.

2. The method according to claim 1, further comprising: receiving, by the access network device, the second group identifier from the core network device.

3. The method according to claim 1, further comprising: allocating, by the access network device, the second group identifier to the first terminal group.

4. The method according to claim 1, further comprising: sending, by the access network device, an identifier of the first physical channel to the terminal comprised in the first terminal group.

5. The method according to claim 1, further comprising: broadcasting, by the access network device, an association relationship between the first terminal group and the first physical channel.

6. An access network device, comprising:

a processor; and a computer readable storage medium storing programming for execution by the processor, the programming including instructions to:

receive from a core network device, a first group identifier of a first terminal group and an identifier of a terminal comprised in the first terminal group; and send the first group identifier and a second group identifier of the first terminal group to the terminal comprised in the first terminal group; wherein the first group identifier and the second group identifier are used to indicate a paging occasion for the first terminal group, and a paging message for the first terminal group is transmitted on a first physical channel, wherein the paging occasion is a subframe that is in a paging frame and that carries a paging information, and the paging frame is a radio frame that carries the paging message, and wherein the paging occasion for the first terminal group is used to send the paging message for the first terminal group in multicast mode.

7. The access network device according to claim 6, wherein the programming further includes instructions to: receive the second group identifier from the core network device.

8. The access network device according to claim 6, wherein the programming further includes instructions to: allocate the second group identifier to the first terminal group.

9. The access network device according to claim 6, wherein the programming further includes instructions to: send an identifier of the first physical channel to the terminal comprised in the first terminal group.

10. The access network device according to claim 6, wherein the programming further includes instructions to: broadcast an association relationship between the first terminal group and the first physical channel.

11. A communication method, comprising:

receiving, by a terminal, a first group identifier and a second group identifier of a first terminal group that are sent by an access network device or a core network device, wherein the terminal is a terminal comprised in the first terminal group; wherein the first group identifier and the second group identifier are used to indicate a paging occasion for the first terminal group, and a paging message for the first terminal group is transmitted on a first physical channel, and wherein the paging occasion is a subframe that is in a paging frame and that carries a paging information, and the paging frame is a radio frame that carries the paging message, and wherein the paging occasion for the first terminal group is used to send the paging message for the first terminal group in multicast mode.

12. The method according to claim 11, wherein the first group identifier is allocated by the core network device; and the second group identifier is allocated by the core network device or the access network device.

13. The method according to claim 11, wherein the terminal receives an identifier that is of the first physical channel and that is sent by the core network device or the access network device; or the first physical channel is agreed on in advance; or an association relationship between the first terminal group and the first physical channel is broadcast in an area served by the access network device.

14. The method according to claim 11, further comprising:

receiving, by the terminal, a priority that is of the first terminal group and that is sent by the core network device; and receiving, by the terminal, the priority sent by the access network device or the priority broadcast in an area served by the access network device; wherein the priority is used to determine whether the paging message for the first terminal group is preferentially transmitted on the paging occasion.

15. The method according to claim 11, wherein the method further comprises: receiving, by the terminal, a modulation and coding scheme that is used for the paging message for the first terminal group and that is sent by the core network device or the access network device, or receiving, by the terminal, a modulation and coding scheme that is used for the paging message for the first terminal group and that is broadcast in an area served by the access network device.

16. A terminal, comprising:

a processor; and a computer readable storage medium storing programming for execution by the processor, the programming including instructions to:

receive a first group identifier and a second group identifier of a first terminal group that are sent by an access network device or a core network device, wherein a terminal is a terminal comprised in the first terminal group; wherein the first group identifier and the second group identifier are used to indicate a paging occasion for the first terminal group, and a paging message for the first terminal group is transmitted on a first physical channel, and wherein the paging occasion is a subframe that is in a paging frame and that carries a paging information, and the paging frame is a radio frame that carries the paging message, and wherein the paging occasion for the first terminal group is used to send the paging message for the first terminal group in multicast mode.

17. The terminal according to claim 16, wherein the first group identifier is allocated by the core network device; and the second group identifier is allocated by the core network device or the access network device.

18. The terminal according to claim 16, wherein
the programming further includes instructions to: receive an identifier that is of the first physical channel and that is sent by the core network device or the access network device; or
the first physical channel is agreed on in advance; or
an association relationship between the first terminal group and the first physical channel is broadcast in an area served by the access network device.

19. The terminal according to claim 16, wherein the programming further includes instructions to:
receive a priority that is of the first terminal group and that is sent by the core network device; and
receive the priority sent by the access network device or the priority broadcast in an area served by the access network device; wherein the priority is used to determine whether the paging message for the first terminal group is preferentially transmitted on the paging occasion.

20. The terminal according to claim 16, wherein the programming further includes instructions to:
receive a modulation and coding scheme that is used for the paging message for the first terminal group and that is sent by the core network device or the access network device, or receive a modulation and coding scheme that is used for the paging message for the first terminal group and that is broadcast in an area served by the access network device.

* * * * *